(12) United States Patent
Chen

(10) Patent No.: US 7,339,729 B2
(45) Date of Patent: Mar. 4, 2008

(54) FOCUSING DEVICE AND A TELESCOPIC TUBE MODULE THEREOF

(76) Inventor: Chun-Hao Chen, 11F, No. 37, Chien Kang, Taipei City (TW)

(*) Notice: Subject to any disclaimer, the term of this patent is extended or adjusted under 35 U.S.C. 154(b) by 246 days.

(21) Appl. No.: 11/229,588

(22) Filed: Sep. 20, 2005

(65) Prior Publication Data

US 2006/0077573 A1    Apr. 13, 2006

(30) Foreign Application Priority Data

Oct. 11, 2004    (TW) .............................. 93216078 U

(51) Int. Cl.
*G02B 23/08*    (2006.01)
(52) U.S. Cl. ........................ 359/405; 359/406; 359/823
(58) Field of Classification Search ................ 359/405, 359/406, 823, 382, 383; 42/125, 126; D16/131, D16/132
See application file for complete search history.

(56) References Cited

U.S. PATENT DOCUMENTS 6,937,392 B2 * 8/2005 Compton .................... 359/430

* cited by examiner

*Primary Examiner*—Hung X. Dang
*Assistant Examiner*—Joseph Martinez
(74) *Attorney, Agent, or Firm*—Rosenberg, Klein & Lee

(57) ABSTRACT

A focusing device and a telescopic tube module thereof are for use with optical equipment. The focusing device has a base module and a telescopic tube module. The base module has a housing, a shaft, and at least two bearings. The telescopic tube module has a tubular body, a bottom reinforced member, and an upper reinforced member. The bottom reinforced member is a reinforced board. The upper reinforced member includes at least two reinforced strips. The tubular body is slidably disposed in the housing. The shaft supports the bottom reinforced member. The at least two bearings support the upper reinforced member. When the shaft drives the tubular body to move, the stability and the precision of the focusing device are improved, and the durability of the tubular body is improved.

15 Claims, 10 Drawing Sheets

FOCUSING DEVICE AND A TELESCOPIC TUBE MODULE THEREOF

BACKGROUND OF THE INVENTION

1. Field of the Invention

The present invention relates to a focusing device and a telescopic tube module thereof, and more particularly, to a focusing device and a telescopic tube module thereof for use with optical equipment such as telescopes or microscopes.

2. Background of the Invention

Telescopes are commonly used for many different purposes and by many different kinds of people, from amateur stargazers and enthusiasts catching a glimpse of astrological phenomena, to scientists conducting academic research. A telescope has a focusing device for adjusting an image of a viewed object, such as a star or a migratory bird, to the focus position of the telescope. As such, the viewed object can be seen distinctly. Therefore, the stability and the precision of the focusing device determine the quality of the telescope.

FIG. 1 and FIG. 2 show a conventional focusing device including a seat assembly 30, a shaft 31, two turn-knob mechanisms 32, a sleeve assembly 33, and a telescopic tube 34. The seat assembly 30 includes a seat (not labeled). The shaft 31 is pivotally disposed in the seat. Inner ends of the two turn-knob mechanisms 32 are respectively assembled on two ends of the shaft 31 and pivotally disposed in the seat. The sleeve assembly 33 includes a sleeve (not labeled). The sleeve is assembled on the seat. The telescopic tube 34 is slidably disposed in the sleeve. The focusing device is assembled in optical equipment such as telescopes and corresponds to an optical axis of an objective lens assembly of the telescope. When focusing, one of the turn-knob mechanisms 32 is rotated, so that the shaft 31 drives the telescopic tube 34 to move back and forth.

As the seat assembly 30 and the sleeve assembly 33 of the above conventional focusing device need to be manually assembled, the number of components thereof is increased and rather complex. As a result, errors in assembly are more likely, costs are increased, and the appearance of the focusing device less attractive. Maintenance work is also more costly and time-consuming.

FIG. 3 and FIG. 4 show another conventional focusing device including a base module 40 and a telescopic tube 47. The base module 40 includes a housing 41, a shaft 42, two turn-knob mechanisms 43, a support plate 44, two support elements 45, and at least two bearings 46. The housing 41 has an inner surface (not labeled) and a passageway (not labeled) formed in the inner surface. The shaft 42 is pivotally disposed in a bottom portion of the housing 41 and perpendicular to a longitudinal axial direction of the passageway. The shaft 42 has a part located in the passageway. The two turn-knob mechanisms 43 have inner ends being respectively assembled on two ends of the shaft 42. The support plate 44 is disposed between the bottom portion of the housing 41 and the shaft 42. The two support elements 45 are screwed in the bottom portion of the housing 41 and push the support plate 44 upward. The at least two bearings 46 are respectively and symmetrically disposed on an upper-left portion and an upper-right portion of the inner surface of the housing 41. The telescopic tube 47 is slidably disposed in the passageway along the longitudinal axial direction thereof. When focusing, one of the turn-knob mechanisms 43 is rotated, so that the shaft 42 drives the telescopic tube 47 to move back and forth.

The telescopic tube 47 is made of aluminum, and the shaft 42 and the bearings 46 are made of steel. When the two support elements 45 push the support plate 44 upward, the support plate 44 pushes the shaft 42 upward to contact the telescopic tube 47. As the hardness of the shaft 42 is greater than that of the telescopic tube 47, the telescopic tube 47 is compressed to form a rough and uneven surface. Also, as the hardness of the bearings 46 is greater than that of the telescopic tube 47, the telescopic tube 47 is compressed to form two concave lines. As a result, the stability and the precision of the focusing device are affected.

Still another conventional focusing device uses a mechanism of gears to drive its telescopic tube to move back and forth. However, there are gaps between the gears. Furthermore, vibrations greatly affect the stability and the precision of the focusing device.

SUMMARY OF THE INVENTION

The primary object of the invention is therefore to specify a focusing device and a telescopic tube module thereof to improve the stability and the precision thereof, to improve the durability thereof, to reduce costs thereof, and to make the appearance thereof more aesthetically pleasing.

According to the invention, the object is achieved via a focusing device. The focusing device comprises a base module and a telescopic tube module. The base module includes a housing, a shaft, and at least two bearings. The housing has an inner surface and a passageway formed in the inner surface. The shaft is pivotally disposed in a bottom portion of the housing and perpendicular to a longitudinal axial direction of the passageway. The shaft has a part located in the passageway. The at least two bearings are respectively disposed on an upper-left portion and an upper-right portion of the inner surface of the housing. The telescopic tube module includes a tubular body, a bottom reinforced member, and an upper reinforced member. The bottom reinforced member is disposed on a bottom portion of an outer surface of the tubular body and extends along a longitudinal axial direction of the tubular body. The upper reinforced member is disposed on an upper-left portion and an upper-right portion of the outer surface of the tubular body. The upper reinforced member forms at least two rails respectively located on the upper-left portion and the upper-right portion of the outer surface of the tubular body and extending along the longitudinal axial direction of the tubular body. The tubular body is slidably disposed in the passageway along the longitudinal axial direction thereof. The shaft supports the bottom reinforced member. The at least two bearings respectively support the at least two rails of the upper reinforced member.

The hardness of the bottom reinforced member and the hardness of the upper reinforced member are greater than that of the tubular body, so that when the shaft drives the tubular body to move, the stability and the precision of the focusing device are improved. Moreover, the durability of the tubular body is improved.

In the preferred embodiment, the bottom reinforced member is a reinforced board.

In the preferred embodiment, the at least two bearings are respectively and symmetrically disposed on the upper-left portion and the upper-right portion of the inner surface of the housing. The upper reinforced member of the telescopic tube module includes at least two reinforced strips. The at least two reinforced strips are respectively and symmetrically disposed on the upper-left portion and the upper-right portion of the outer surface of the tubular body. The at least two rails are respectively formed on the at least two reinforced strips and extend along the longitudinal axial direction of the tubular body. The at least two bearings respectively support the at least two rails of the at least two reinforced strips.

In the preferred embodiment, two imaginative lines respectively connect the at least two bearings to a central line of the passageway and form an angle of 120 degrees. Another two imaginative lines respectively connect the at least two rails to a central line of the tubular body and form an angle of 120 degrees.

In the preferred embodiment, the base module includes another two bearings. The four bearings are respectively and symmetrically disposed on a front end of the upper-left portion, a rear end of the upper-left portion, a front end of the upper-right portion, and a rear end of the upper-right portion of the inner surface of the housing. The four bearings respectively support the at least two rails.

In the preferred embodiment, the at least two bearings are respectively and symmetrically disposed on the upper-left portion and the upper-right portion of the inner surface of the housing. The upper reinforced member of the telescopic module includes a curved reinforced plate. The curved reinforced plate has a left side and a right side being respectively and symmetrically disposed on the upper-left portion and the upper-right portion of the outer surface of the tubular body. The at least two rails are respectively formed on the left side and the right side of the curved reinforced plate and extend along the longitudinal axial direction of the tubular body. The at least two bearings respectively support the at least two rails of the left side and the right side of the curved reinforced plate.

In the preferred embodiment, the housing has a seat and a sleeve formed integrally. The shaft is pivotally disposed in the seat. The inner surface and the passageway are formed in the sleeve. Therefore, compared to the prior art the precision of the focusing device is much better, the costs of the focusing device are reduced, and the appearance of the focusing device is more aesthetically pleasing.

According to the invention, the object is achieved via a telescopic tube module of a focusing device. The telescopic tube module comprises a tubular body and a reinforced member. The reinforced member is disposed on an outer surface of the tubular body. The reinforced member forms at least two rails extending along a longitudinal axial direction of the tubular body. Two imaginative lines respectively connect the at least two rails to a central line of the tubular body and form an angle that is larger than 0 degrees and smaller than 180 degrees.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention which will be described hereinafter and which will form the subject of the claims appended hereto.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE EMBODIMENTS

FIGS. 5-8 show a first embodiment of the present invention. The present invention provides a focusing device and a telescopic tube module thereof. The focusing device comprises a base module 1 and a telescopic tube module 2.

Figure 1:
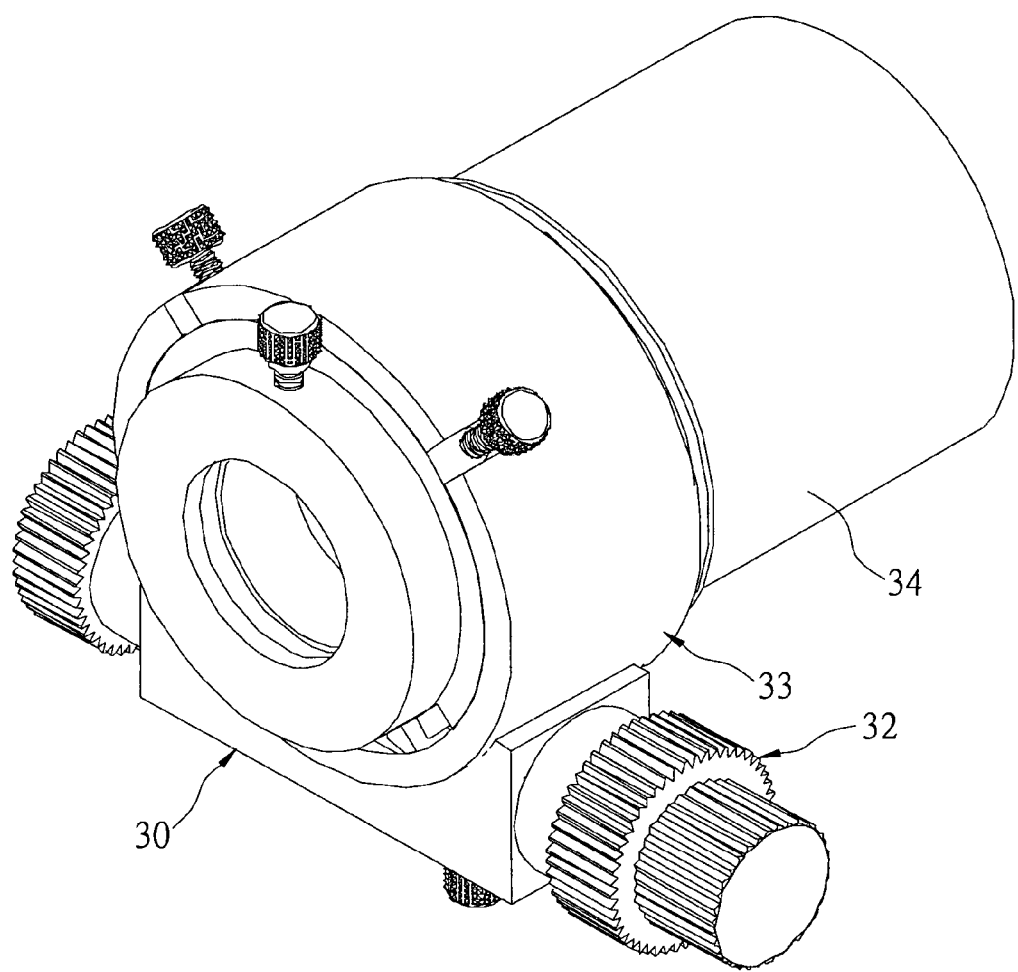
FIG. 1 is an assembled perspective view of a focusing device of the prior art.
Figure 2:
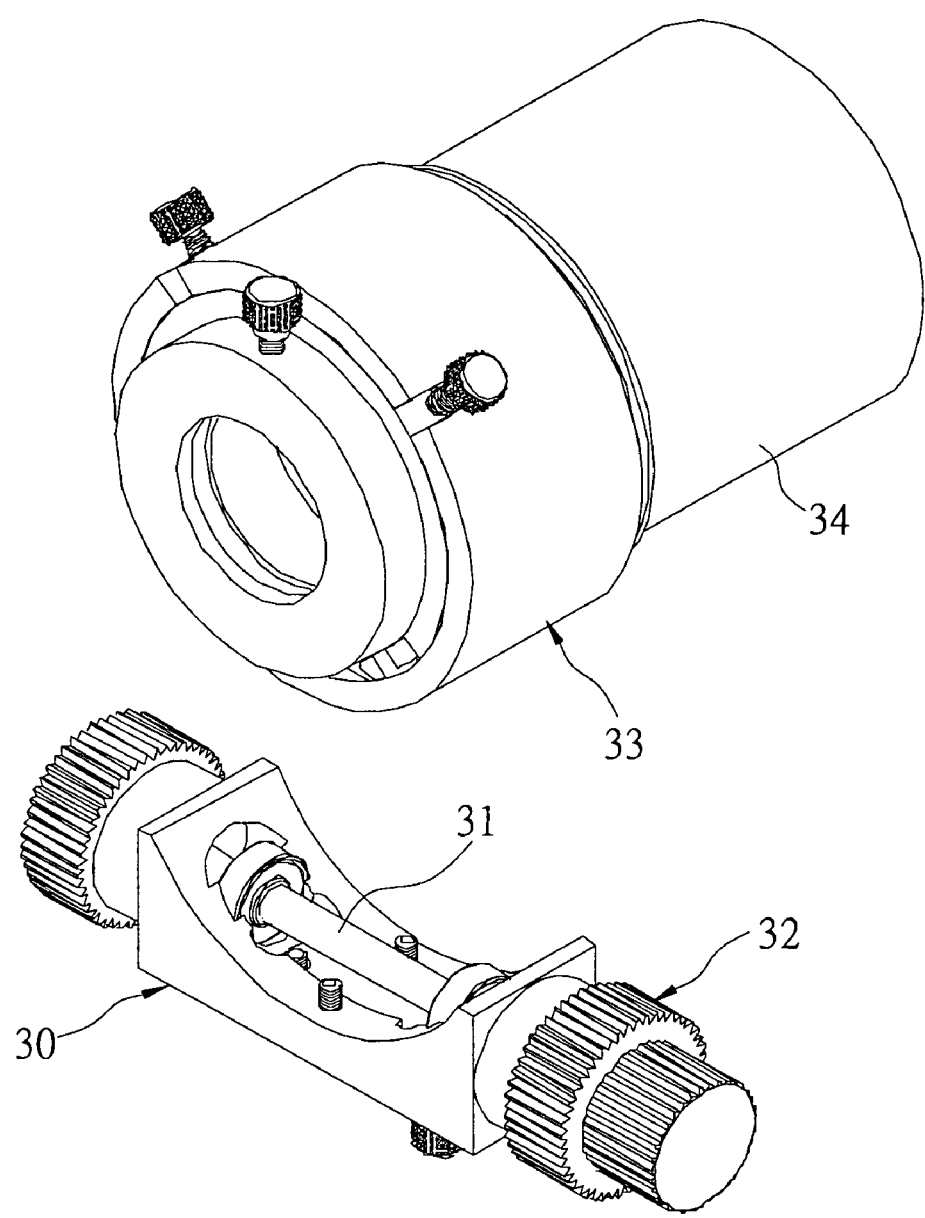
FIG. 2 is an exploded perspective view of FIG. 1.
Figure 3:
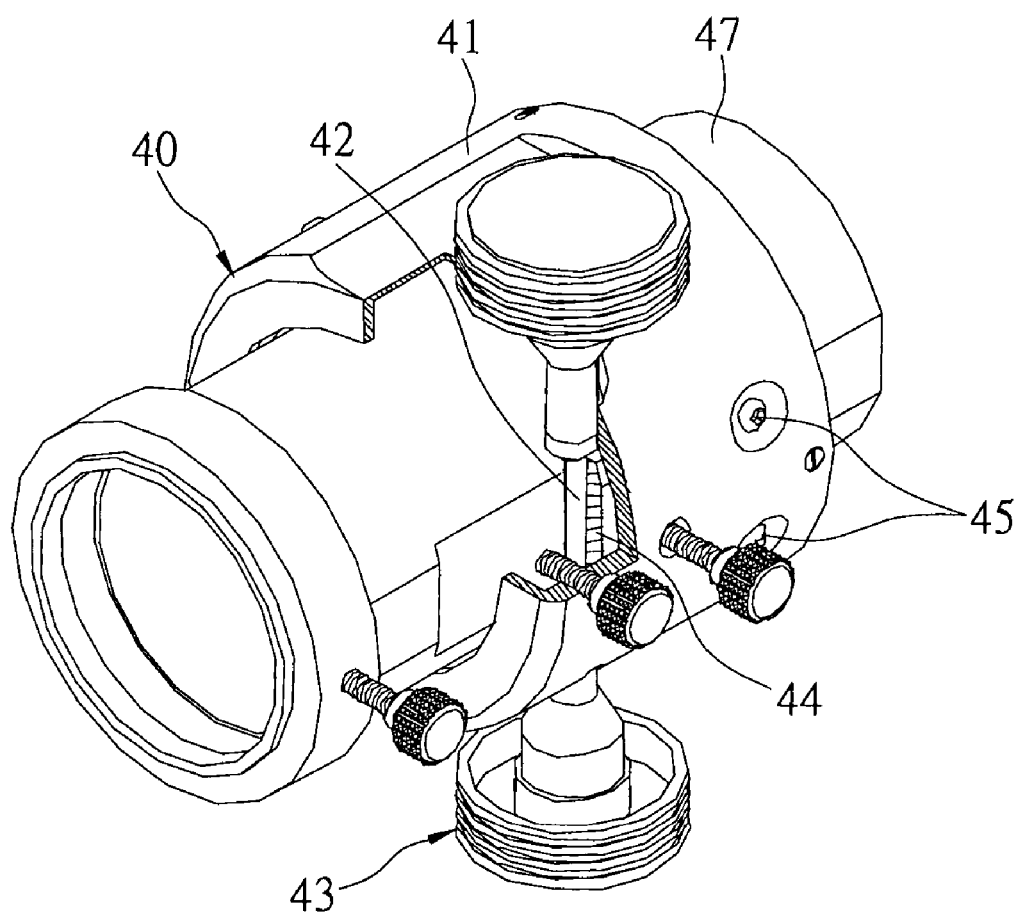
FIG. 3 is a partial cutaway perspective view of another focusing device of the prior art.
Figure 4:
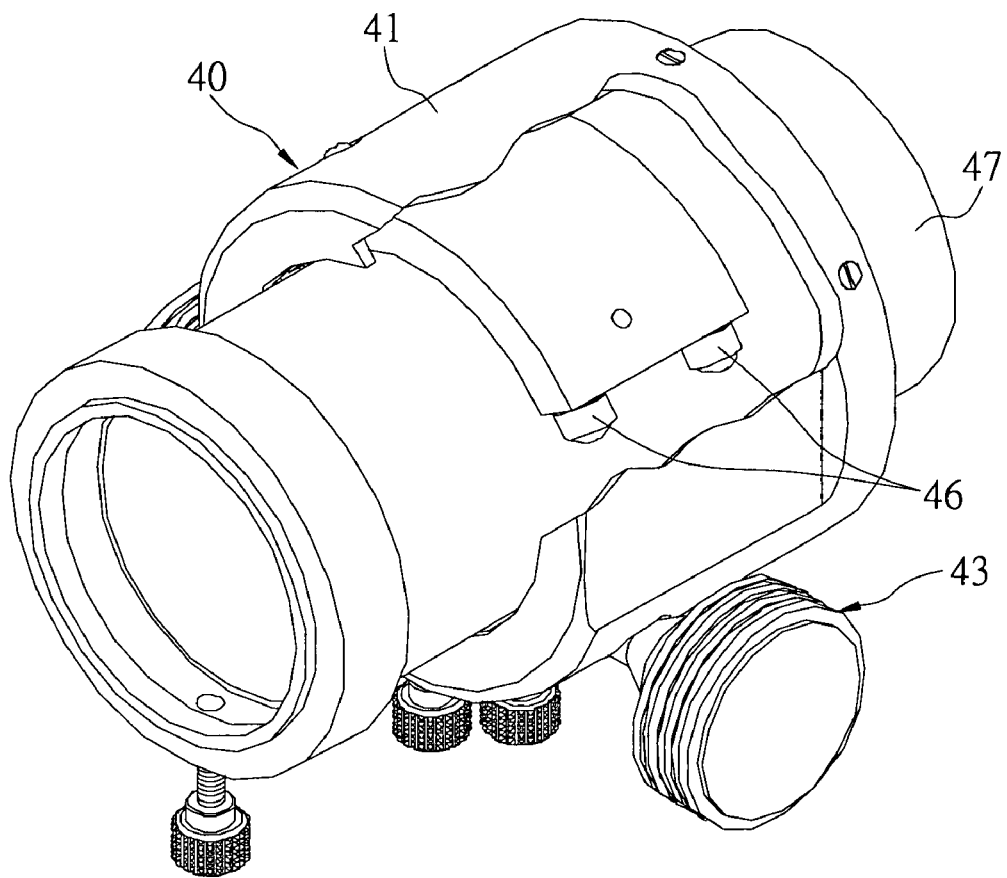
FIG. 4 is another partial cutaway perspective view of FIG. 3.
Figure 5:
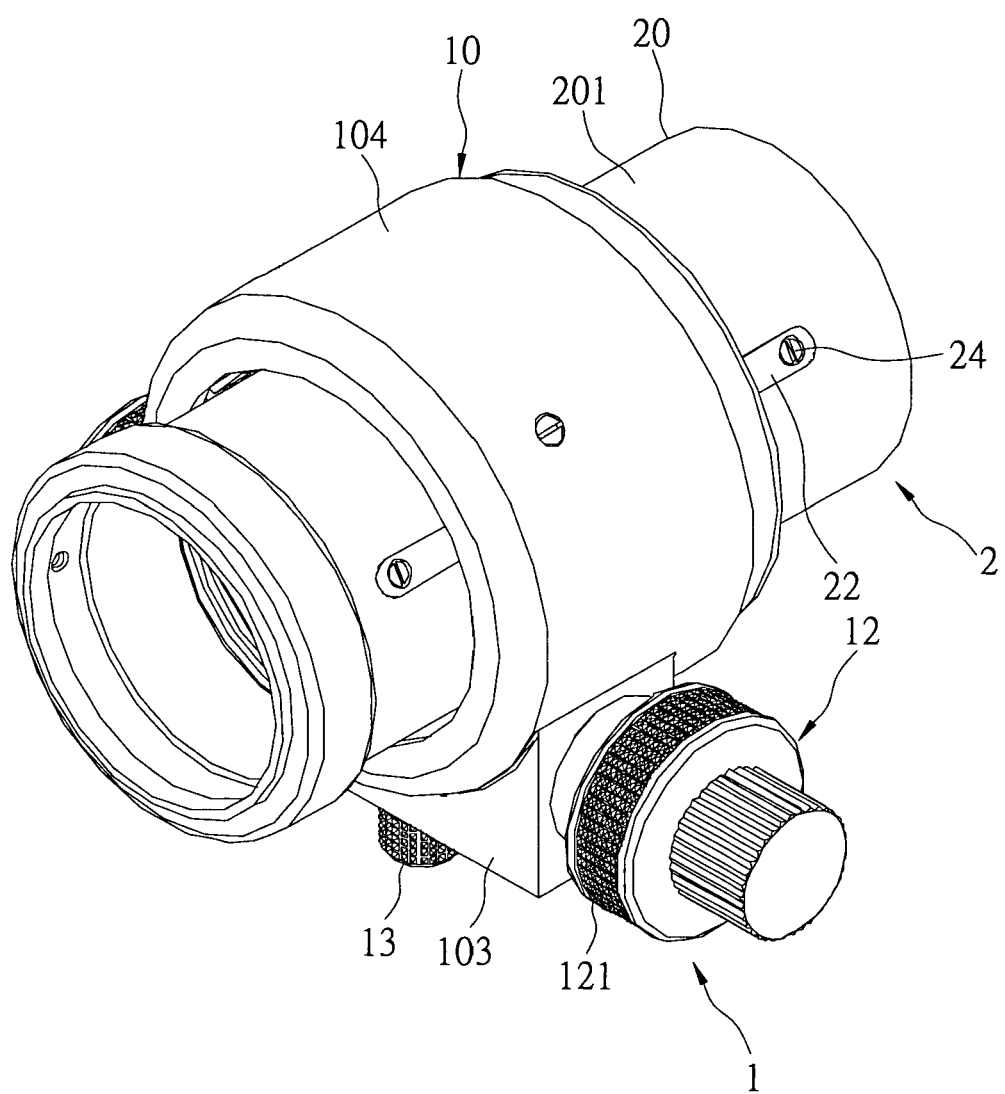
FIG. 5 is an assembled perspective view of a first embodiment of a focusing device of the present invention.
Figure 6:
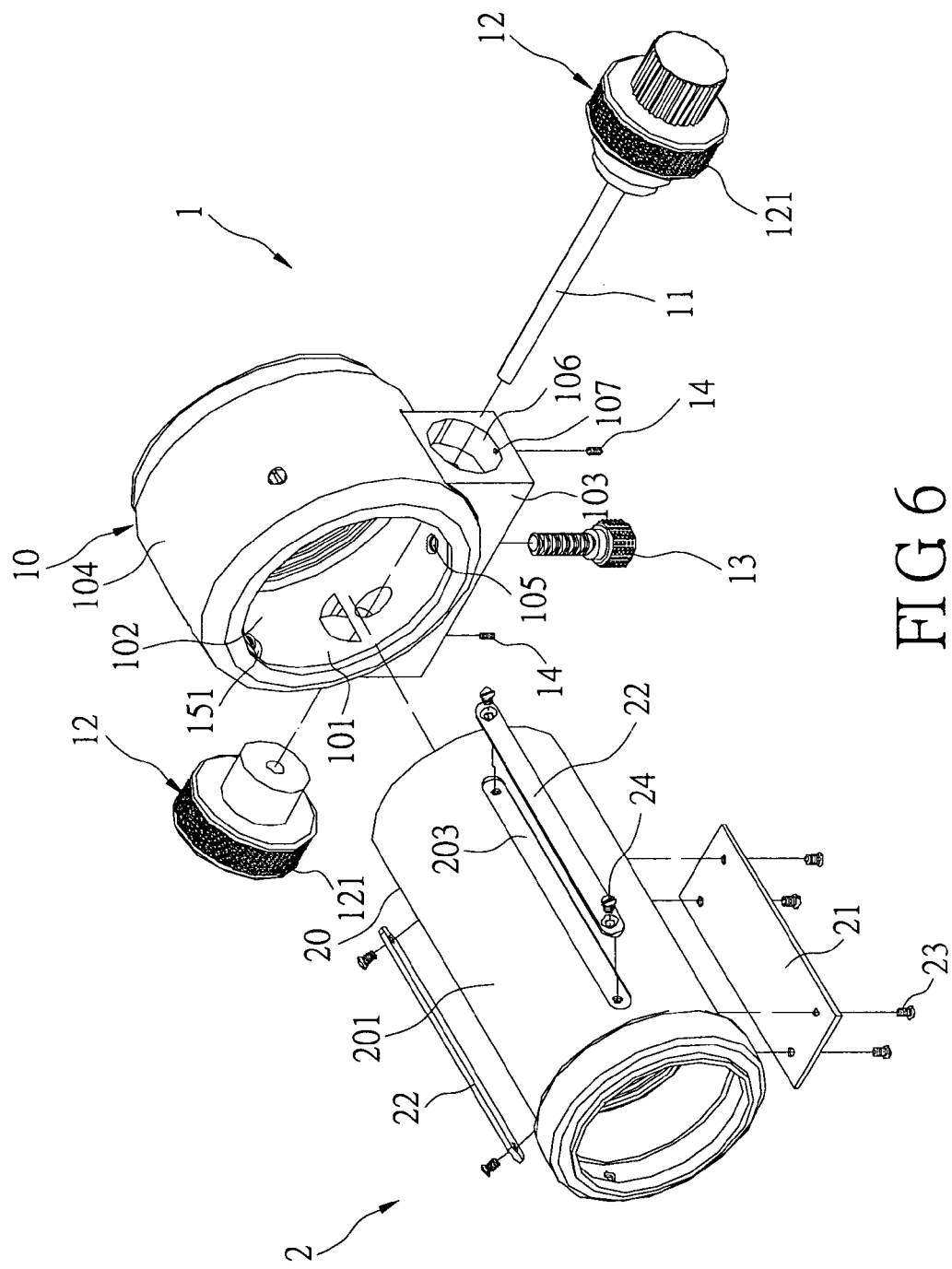
FIG. 6 is an exploded perspective view of FIG. 5.
Figure 7:
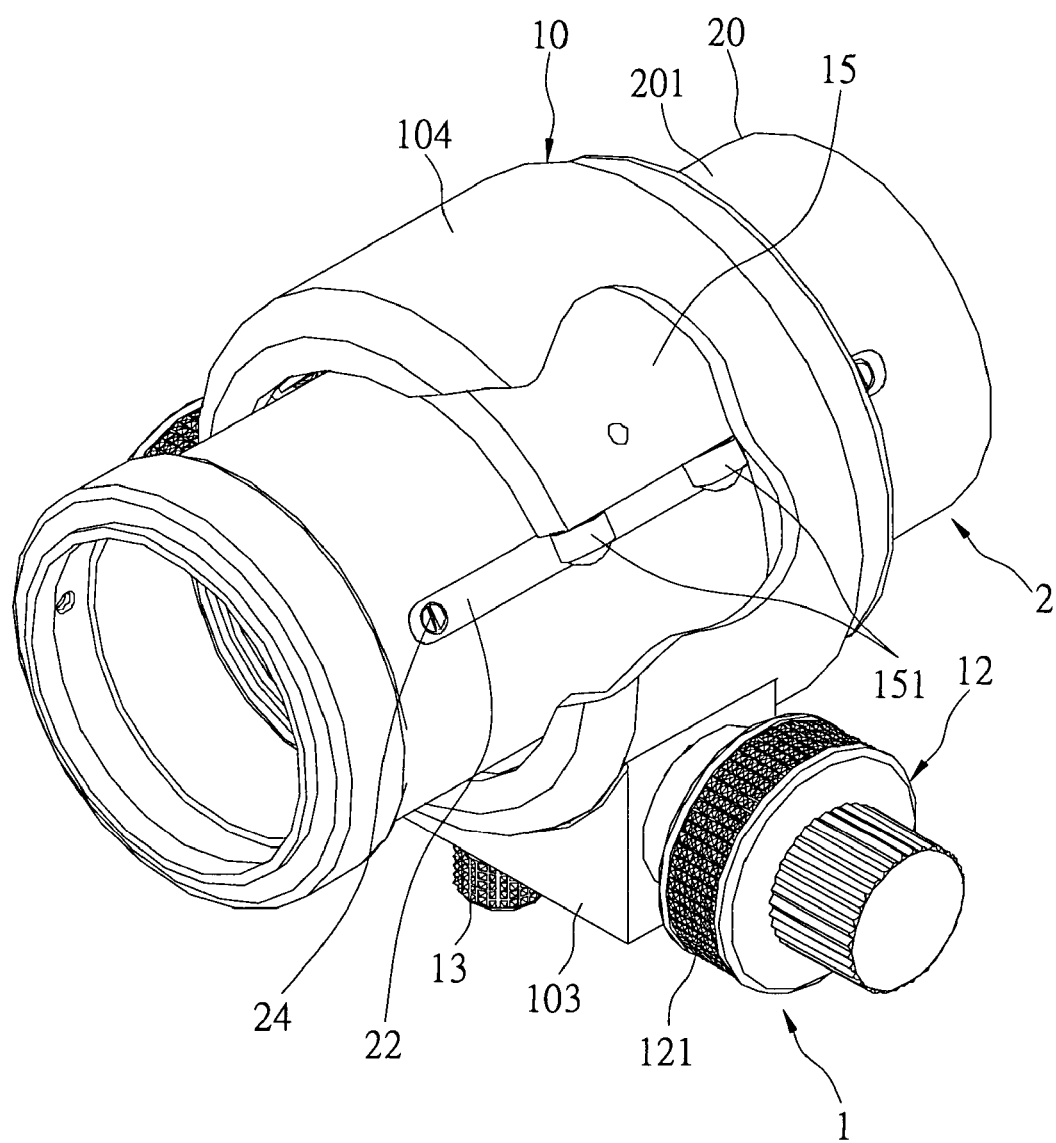
FIG. 7 is a partial cutaway perspective view of FIG. 5.
Figure 8:
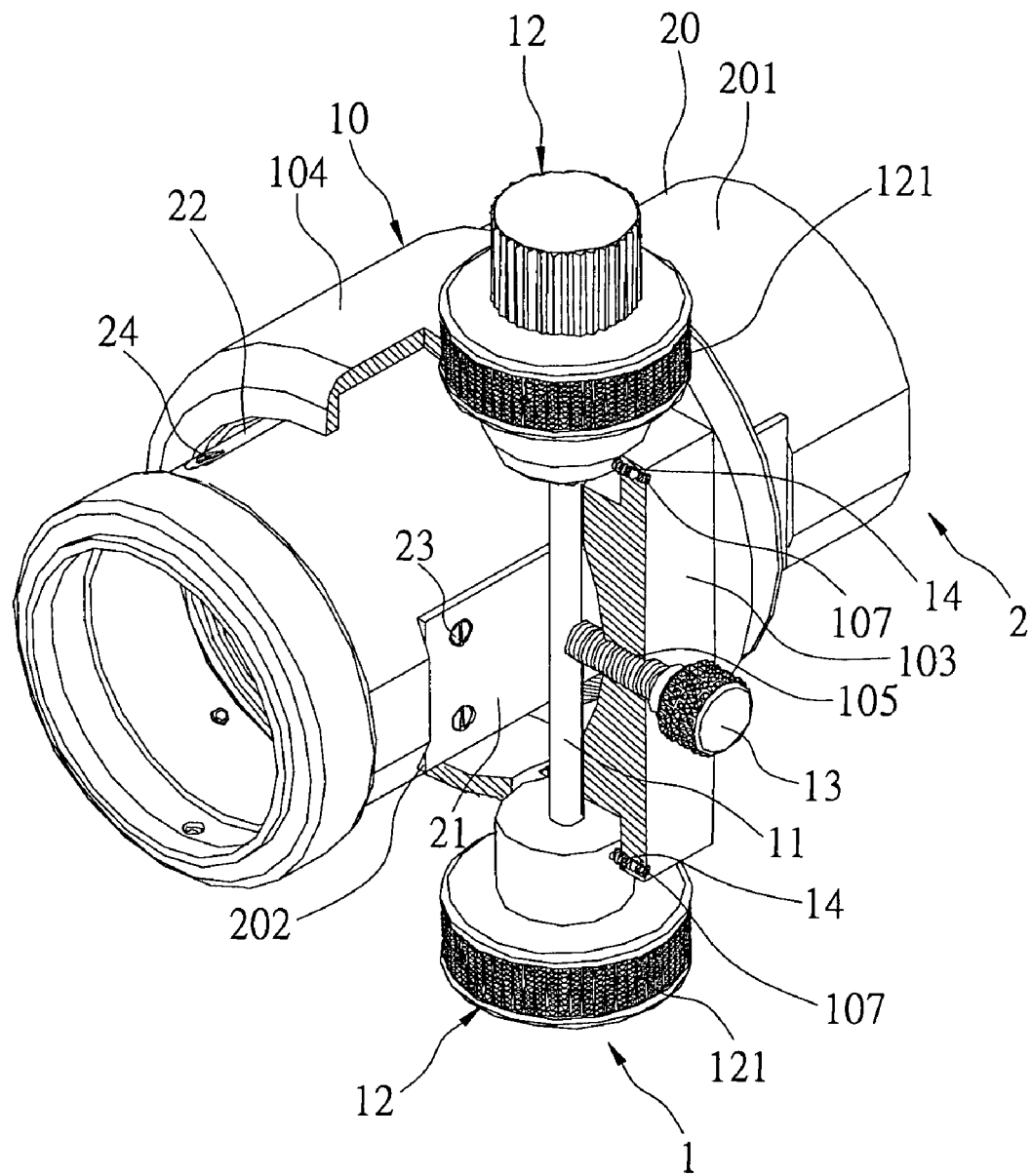
FIG. 8 is another partial cutaway perspective view of FIG. 5.

The base module 1 includes a housing 10, a shaft 11, two turn-knob mechanisms 12, a fastener 13, two support elements 14, and a bearing seat 15. The housing 10 has an inner surface 101 and a passageway 102 formed in the inner surface 101. In this embodiment, the housing 10 has a seat 103 and a sleeve 104 formed integrally. However, the housing 10 may have a seat and a sleeve assembled together (referring to FIG. 1 and FIG. 2). The inner surface 101 and the passageway 102 are formed in the sleeve 104.

A bottom portion of the housing 10 has a through hole 105 (such as a screw hole) communicating with the passageway 102. The bottom portion of the housing 10 has two pivotal holes 106 respectively disposed in a left side and a right side thereof and communicating with the passageway 102. The bottom portion of the housing 10 further has two through holes 107 (such as two screw holes) respectively communicating with the two pivotal holes 106.

The shaft 11 penetrates through the two pivotal holes 106. The two turn-knob mechanisms 12 have inner ends being respectively assembled on two ends of the shaft 11 and pivotally disposed in the two pivotal holes 106, so that the shaft 11 is pivotally disposed in the seat 103 of the bottom portion of the housing 10 and perpendicular to a longitudinal axial direction of the passageway 102. The shaft 11 has a part located in the passageway 102. The two turn-knob mechanisms 12 have outer ends being disposed outside the bottom portion of the housing 10. Each of the turn-knob mechanisms 12 further has a rubber ring 121 surrounding the outer end of the corresponding turn-knob mechanism 12, so that the operation of the two turn-knob mechanisms 12 is much easier.

The fastener 13 (such as a bolt) is screwed in the through hole 105. The two support elements 14 (such as two screws) are respectively screwed in the two through holes 107 and respectively push the inner ends of the two turn-knob mechanisms 12 upward.

Figure 9:
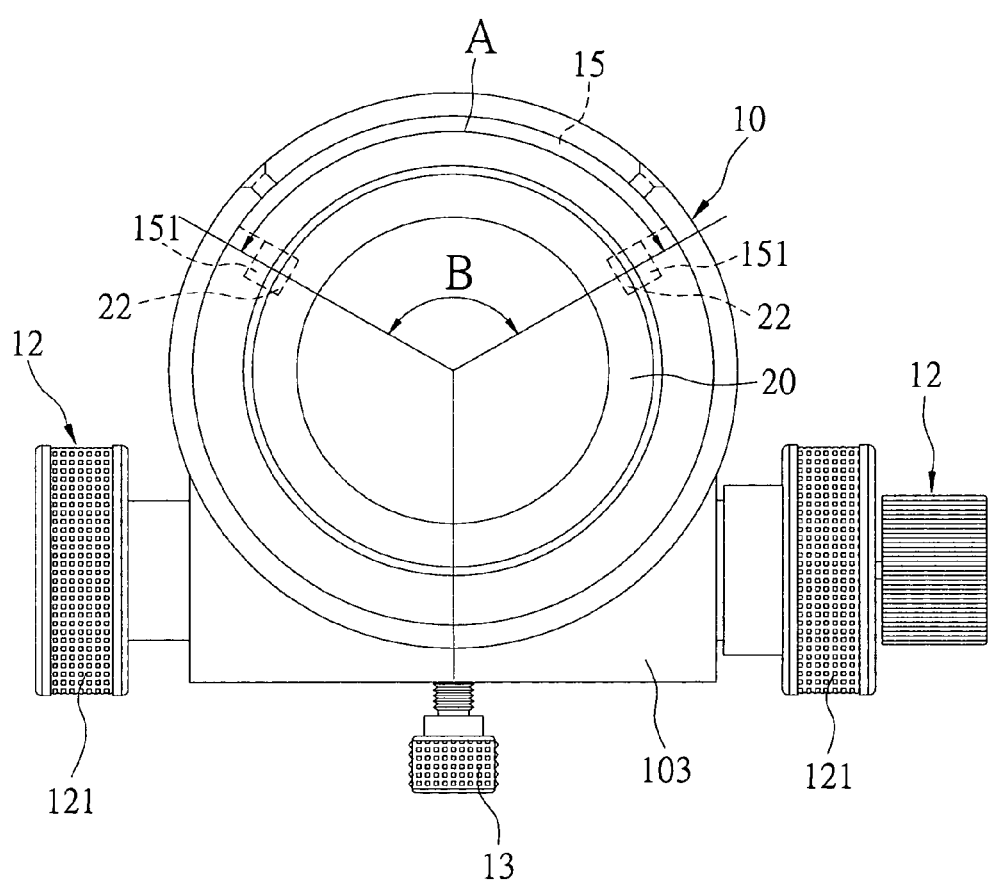
FIG. 9 is a schematic front view of FIG. 5.

The bearing seat 15 is assembled on an upper portion of the inner surface 101 of the housing 10 and has at least two bearings 151. The at least two bearings 151 are respectively disposed on an upper-left portion (see FIG. 6) and an upper-right portion (see FIG. 7) of the inner surface 101 of the housing 10. As shown in FIG. 9, in this embodiment, the at least two bearings 151 are respectively and symmetrically disposed on the upper-left portion and the upper-right portion of the inner surface 101 of the housing 10, and two imaginative lines respectively connect the at least two bearings 151 to a central line of the passageway 102 and form an angle A of 120 degrees. However, the angle A is not restricted to the above embodiment.

The telescopic tube module 2 includes a tubular body 20, a bottom reinforced member, and an upper reinforced member. The tubular body 20 may be made of aluminum. The bottom reinforced member and the upper reinforced member may be made of steel, so that the hardness of the bottom reinforced member and the hardness of the upper reinforced member are greater than that of the tubular body 20.

The bottom reinforced member is disposed on a bottom portion of an outer surface 201 of the tubular body 20 and extends along a longitudinal axial direction of the tubular body 20. In this embodiment, the bottom reinforced member is a reinforced board 21. The bottom portion of the outer surface 201 of the tubular body 20 has a concave slot 202. The telescopic tube module 2 further includes a plurality of fixing elements 23, and the fixing elements 23 penetrate through a front end and a rear end of the reinforced board 21 and are secured in the tubular body 20. As such, the reinforced board 21 is disposed in the concave slot 202 of the bottom portion of the outer surface 201 of the tubular body 20, and the reinforced board 21 extends along the longitudinal axial direction of tubular body 20.

The upper reinforced member is disposed on an upper-left portion and an upper-right portion of the outer surface 201 of the tubular body 20. The upper reinforced member forms at least two rails respectively located on the upper-left portion and the upper-right portion of the outer surface 201 of the tubular body 20 and extending along the longitudinal axial direction of the tubular body 20. Two imaginative lines respectively connect the at least two rails to a central line of the tubular body 20 and form an angle that is larger than 0 degrees and smaller than 180 degrees.

In this embodiment, the upper reinforced member includes at least two reinforced strips 22. Both the upper-left portion and the upper-right portion of the outer surface 201 of the tubular body 20 have an elongated slot 203, and the elongated slots 203 are symmetrical with each other. The telescopic tube module 2 further includes a plurality of fixing elements 24, and the fixing elements 24 penetrate through a front end and a rear end of the at least two reinforced strips 22 and are secured in the tubular body 20. As such, the at least two reinforced strips 22 are respectively and symmetrically disposed in the two elongated slots 203 of the upper-left portion and the upper-right portion of the outer surface 201 of the tubular body 20, and the at least two rails are formed respectively on the at least two reinforced strips 22 and extend along the longitudinal axial direction of the tubular body 20.

Therefore, two imaginative lines respectively connect the at least two rails of the at least two reinforced strips 22 to a central line of the tubular body 20 and form an angle that is larger than 0 degrees and smaller than 180 degrees. As shown in FIG. 9, in this embodiment, two imaginative lines respectively connect the at least two rails of the at least two reinforced strips 22 to a central line of the tubular body 20 and form an angle B of 120 degrees. However, the angle B is not restricted to the above embodiment.

The tubular body 20 is slidably disposed in the passageway 102 of the housing 10 along the longitudinal axial direction thereof. The shaft 11 supports the reinforced board 21 (the bottom reinforced member), and the at least two bearings 151 respectively support the at least two rails of the at least two reinforced strips 22 (the at least two rails of the upper reinforced member).

In this embodiment, the bearing seat 15 of the base module 1 includes another two bearings 151. The four bearings 151 are respectively and symmetrically disposed on a front end of the upper-left portion (see FIG. 6), a rear end of the upper-left portion (not shown), a front end of the upper-right portion, and a rear end of the upper-right portion (see FIG. 7) of the inner surface 101 of the housing 10. The four bearings 151 respectively support the at least two rails of the at least two reinforced strips 22, so the telescopic tube module 2 has better balance.

The focusing device of the present invention is assembled in optical equipment such as a telescope and corresponds to an optical axis of an objective lens assembly of the telescope. When focusing, the two support elements 14 are firstly adjusted to push the inner ends of the turn-knob mechanisms 12 upward, so that the shaft 11 contacts the reinforced board 21, and the at least two rails of the at least two reinforced strips 22 contact the bearings 151. As the hardness of the reinforced board 21 and the hardness of the at least two reinforced strips 22 are greater than that of the tubular body 20, the tubular body 20 will not be compressed by the shaft 11 and the bearings 151.

Next, one of the turn-knob mechanisms 12 is rotated, so that the shaft 11 drives the tubular body 20 to move back and forth. As the hardness of the reinforced board 21 is greater than that of the tubular body 20, the movement of the tubular body 20 is more precise and easier. When a focus position is obtained, the fastener 13 is rotated to press against the reinforced board 21, so as to ensure that the tubular body 20 is firmly retained.

Figure 10:
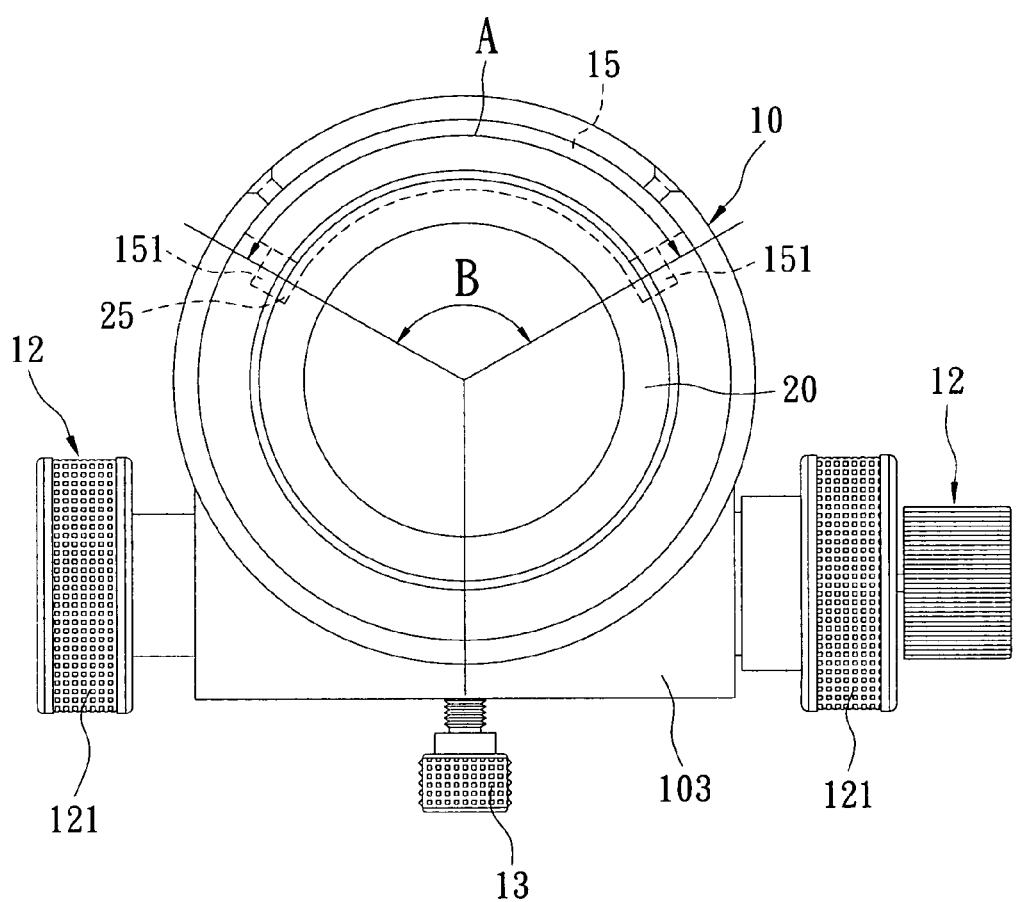
FIG. 10 is a schematic front view of a second embodiment of a focusing device of the present invention.

FIG. 10 shows a second embodiment of the present invention. The difference between the second embodiment and the first embodiment is the upper reinforced member. The upper reinforced member includes a curved reinforced plate 25. The curved reinforced plate 25 may have a quadrilateral shape, a quadrilateral-framed shape, an H shape, or a U shape. In this embodiment, the curved reinforced plate 25 has a left side and a right side being respectively and symmetrically disposed on the upper-left portion and the upper-right portion of the outer surface 201 of the tubular body 20. The at least two rails are respectively formed on the left side and the right side of the curved reinforced plate 25 and extend along the longitudinal axial direction of the tubular body 20. The at least two bearings 151 respectively support the at least two rails of the left side and the right side of the curved reinforced plate 25.

As indicated above, the focusing device and a telescopic tube module thereof of the present invention have the following advantages:

(1) The hardness of the bottom reinforced member and the hardness of the upper reinforced member are greater than that of the tubular body, so that when the shaft drives the tubular body to move, the stability and the precision of the focusing device are improved. Moreover, the durability of the tubular body is improved.

(2) Two imaginative lines respectively connect the at least two bearings to a central line of the passageway and form an angle of 120 degrees, and another two imaginative lines respectively connect the at least two rails of the at least two reinforced strips or the curved reinforced plate to a central line of the tubular body and form an angle of 120 degrees, so that the stability of the tubular body is improved.

(3) The seat and the sleeve are formed integrally, so that the precision of the focusing device is improved, the costs of the focusing device are reduced, and the appearance of the focusing device is more aesthetically pleasing.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A focusing device comprising:
    a base module including a housing, a shaft, and at least two bearings, the housing having an inner surface and a passageway formed in the inner surface, the shaft being pivotally disposed in a bottom portion of the housing and perpendicular to a longitudinal axial direction of the passageway, the shaft having a part located in the passageway, and the at least two bearings being respectively disposed on an upper-left portion and an upper-right portion of the inner surface of the housing; and
    a telescopic tube module including a tubular body, a bottom reinforced member, and an upper reinforced member, the bottom reinforced member being disposed on a bottom portion of an outer surface of the tubular body and extending along a longitudinal axial direction of the tubular body, the upper reinforced member being disposed on an upper-left portion and an upper-right portion of the outer surface of the tubular body, the upper reinforced member forming at least two rails respectively located on the upper-left portion and the upper-right portion of the outer surface of the tubular body and extending along the longitudinal axial direction of the tubular body; wherein
    the tubular body is slidably disposed in the passageway along the longitudinal axial direction thereof the shaft supports the bottom reinforced member, and the at least two bearings respectively support the at least two rails of the upper reinforced member.

2. The focusing device as claimed in claim 1, wherein the bottom reinforced member is a reinforced board.

3. The focusing device as claimed in claim 1, wherein the bottom portion of the outer surface of the tubular body has a concave slot, and the bottom reinforced member is disposed in the concave slot.

4. The focusing device as claimed in claim 1, wherein the telescopic tube module includes a plurality of fixing elements, and the fixing elements penetrate through a front end and a rear end of the bottom reinforced member and are secured in the tubular body.

5. The focusing device as claimed in claim 1, wherein the at least two bearings are respectively and symmetrically disposed on the upper-left portion and the upper-right portion of the inner surface of the housing, the upper reinforced member of the telescopic tube module includes at least two reinforced strips, the at least two reinforced strips are respectively and symmetrically disposed on the upper-left portion and the upper-right portion of the outer surface of the tubular body, the at least two rails are respectively formed on the at least two reinforced strops and extend along the longitudinal axial direction of the tubular body, and the at least two bearings respectively support the at least two rails of the at least two reinforced strips.

6. The focusing device as claimed in claim 5, wherein both the upper-left portion and the upper-right portion of the outer surface of the tubular body have an elongated slot, the elongated slots are symmetrically with each other, and the least two reinforced strips are respectively disposed in the two elongated slots.

7. The focusing device as claimed in claim 5, wherein the telescopic tube module includes a plurality of fixing elements, and the fixing elements penetrate through a front end and a rear end of the at least two reinforced strips and are secured in the tubular body.

8. The focusing device as claimed in claim 1, wherein two imaginative lines respectively connect the at least two bearings to a central line of the passageway and form an angle of 120 degrees, and another two imaginative lines respectively connect to the at least two rails to a central line of the tubular body and form an angle of 120 degrees.

9. The focusing device as claimed in claim 1, wherein the base module includes another two bearings, the four bearings are respectively and symmetrically disposed on a front end of the upper-left portion, a rear end of the upper-right portion of the inner surface of the housing, and the four bearings respectively support the at least two rails.

10. The focusing device as claimed in claim 1, wherein the least two bearings are respectively and symmetrically disposed on the upper-left portion and the upper-right portion of the inner surface of the housing, the upper reinforced member of the telescopic tube module includes a curved reinforced plate, the curved reinforced plate has a left side an a right side being respectively and symmetrically disposed on the upper-left portion and the upper-right portion of the outer surface of the tubular body, the at least two rails are respectively formed on the left side and the right side of the curved reinforced plate and extend along the longitudinal axial direction of the tubular body, and the at least two bearings respectively support the at least two rails of the left side and the right side of the curved reinforced plate.

11. The focusing device as claimed in claim 1, wherein base module includes a fastener, the bottom portion of the housing has a through hole communication with the passageway, and the fastener is screwed in the through hole.

12. The focusing device as claimed in claim 1, wherein the housing has a seat and a sleeve formed integrally, the shaft is pivotally disposed in the seat, and the inner surface and the passageway are formed in the sleeve.

13. The focusing device as claimed in claim 1, wherein the housing has a seat and a sleeve assembled together, the shaft is pivotally disposed in the seat, and the inner surface and the passageway are formed in the sleeve.

14. The focusing device as claimed in claim 1, wherein the base module includes two turn-knob mechanisms, the bottom portion of the housing has two pivotal holes respectively disposed in a left side and right side thereof and communicating with the passageway, the shaft penetrates through the two pivotal holes, the two turn-knob mechanisms have inner ends being respectively assembled on two ends of the shaft and pivotally disposed in the two pivotal holes, and the two turn-knob mechanisms have outer ends being disposed outside the bottom portion of the housing.

15. The focusing device as claimed in claim 14, wherein the base module includes two support elements, the bottom portion of the housing has two through holes respectively communicating with the two pivotal holes, and the two support elements are respectively screwed in the two though holes and respectively push the inner ends of the two turn-knob mechanisms upward.

* * * * *